United States Patent Office 3,353,620
Patented Nov. 21, 1967

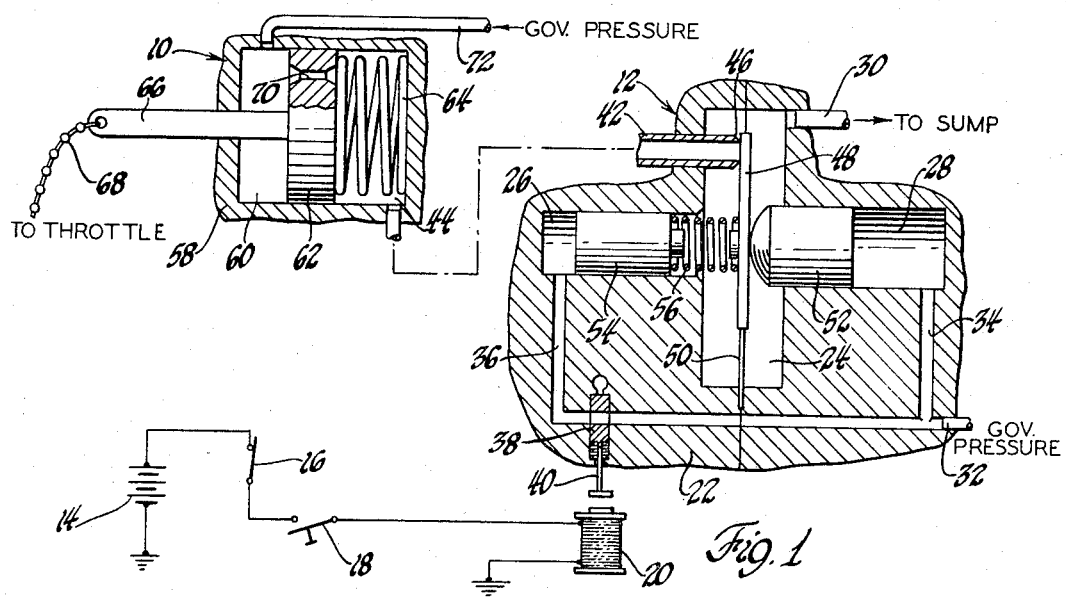
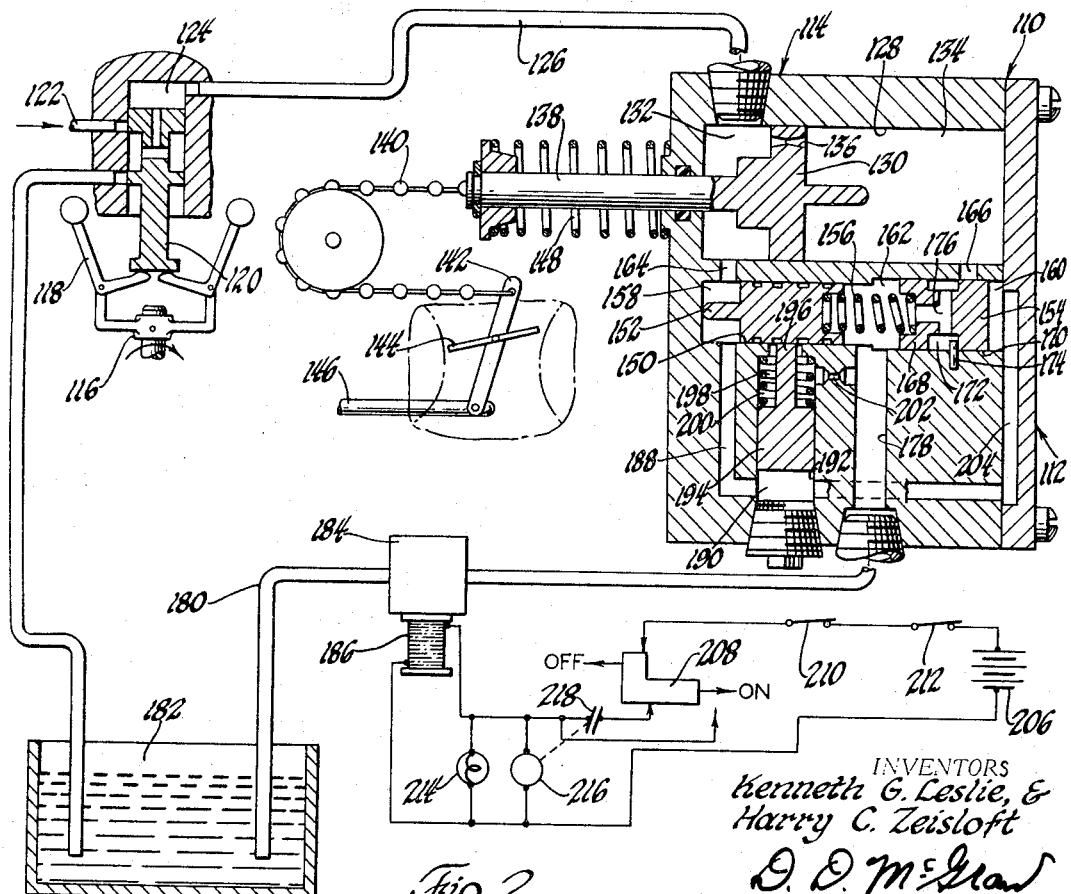

3,353,620
VEHICLE ROAD SPEED CONTROL
Kenneth G. Leslie, Fenton, and Harry C. Zeisloft, Flint, Mich., assignors to General Motors Corporation, Detroit, Mich., a corporation of Delaware
Filed Feb. 21, 1966, Ser. No. 528,882
10 Claims. (Cl. 180—108)

The invention relates to mechanisms or systems for controlling the road speed of a vehicle, and more particularly to those which maintain the vehicle speed at a desired set speed under varying road load conditions. A system embodying the invention permits the selection of the desired speed to be made in a simple and direct manner. The selection is made by merely energizing the system while the vehicle is traveling at the desired speed. The system then establishes this speed as the desired or selected speed input. A system embodying the invention also utilizes information reflecting actual vehicle speed and compares the two speeds. The result of this comparison may be considered to be a vehicle speed error signal. This signal is reflected in the position of a valve element which in turn controls a fluid pressure actuated servomotor which controls the vehicle engine throttle valve so as to change the delivered speed and power characteristics of the engine in such a manner as to reduce the speed error toward zero.

Systems embodying the invention utilize a fluid pressure which not only reflects actual vehicle speed, but also furnishes the power pressure for the throttle valve control servomotor. Such a fluid pressure may be either positive or negative air pressure or positive hydraulic pressure. In the preferred forms of the invention schematically disclosed in the drawing, positive hydraulic pressure is utilized since such a pressure is readily available in vehicles having automatic transmissions. Automatic transmissions usually generate a hydraulic governor pressure which reflects actual vehicle speed and operates through a sufficiently wide range in values of pressure to be utilized as a source of power as well as a source of vehicle speed information. One embodiment of the invention here disclosed utilizes a hydraulic lock to establish the set speed, hydraulically locking governor pressure fluid in a chamber in which a speed setting piston operates. The other embodiment of the invention here disclosed utilizes a pressure differential energized locking piston which mechanically engages the set speed piston. In both embodiments the position of the set speed piston is established by the governor pressure and the piston is locked in a position that reflects the desired vehicle speed. Both embodiments utilize control circuitry having various safety and fail-safe characteristics.

In the drawing:
FIGURE 1 is a schematic illustration of the first embodiment of the invention, with parts being broken away and in section.
FIGURE 2 is a schematic illustration of a second embodiment of the invention with parts being broken away and in section.

The system shown in FIGURE 1 includes a servomotor assembly 10 which is connected to operate the vehicle engine throttle, a valve assembly 12, and appropriate conduits and connections to provide an operative system. The system includes an electrical circuit containing in series a source of electrical power such as battery 14, a normally closed brake operated switch 16, a set switch 18, and a solenoid winding 20. The solenoid 20 is electrically energized when both switches 16 and 18 are closed. Switch 16 is normally closed but is opened when the vehicle brakes are applied. Switch 18 may be manually opened and closed.

The valve assembly 12 includes a housing 22 having formed therein a valve chamber 24 and piston chambers 26 and 28. Chambers 26 and 28 are axially aligned and open into chamber 24 on opposite sides of that chamber. Chamber 28 is slightly larger in diameter than chamber 26. A conduit 30 connects chamber 24 to exhaust, which may be the transmission oil sump. A conduit 32 receives governor pressure from a suitable source such as the automatic transmission, which generates fluid pressure reflecting vehicle road speed. Conduit 32 is connected through passage 34 to chamber 28 and through passage 36 to chamber 26. A valve 38 intersects passage 36 and the valve may be moved to either open or close the passage. This movement is accomplished by energization of the solenoid 20, with an armature 40 being connected to the valve 38. When the solenoid is energized, valve 38 closes passage 36.

A conduit 42 interconnects chamber 24 and a chamber 44 in the servomotor assembly 10. The end of conduit 42 extending within chamber 24 is formed to provide an orifice type valve seat 46 against which a flapper valve 48 may be positioned to open and close the seat. Valve 48 is supported in chamber 24 by a leaf spring 50. A piston 52, reciprocably received in chamber 28, has one end in engagement with the side of flapper valve 48 so that movement of the piston outwardly in chamber 28 and toward chamber 24 tends to seat the flapper valve against the valve seat 46. A piston 54 is reciprocably received in chamber 26 and a compression spring 56 mechanically connects piston 54 and the side of flapper valve 48 opposite piston 52. Thus the spring tends to urge flapper valve 48 in a valve seat opening direction, as does movement of piston 54 outwardly in chamber 26 toward chamber 24.

The servomotor assembly 10 has a housing 58 formed to provide a cylinder bore containing chamber 44 and chamber 60. These chambers are separated by a power wall which is schematically illustrated in the drawing as a piston 62. A spring 64 in chamber 44 urges piston 62 toward chamber 60. The piston is provided with a piston rod 66 extending through chamber 60 and out of housing 58. A flexible chain 68 connects the rod to the engine throttle linkage so that movement of the piston rod to place the chain in tension will exert a throttle opening force on the throttle linkage. The piston 62 is provided with an orifice 70 which fluid connects chambers 44 and 60. The same governor pressure that is received through conduit 32 of the valve assembly is also received in conduit 72 of the servomotor assembly, which is fluid connected to chamber 60.

When the governor pressure, which is a fluid pressure proportional to vehicle road speed, is imposed in chambers 26 and 28 with the valve 38 open, the force generated by the pressure acting on the area of piston 52 will be greater than that force generated by the pressure acting on the area of piston 54, with the result that the pistons will move to close flapper valve 48 against orifice 46. Piston 54 will move to the right, compressing the governor spring 56 and taking a position proportional to the differential pressure across piston 54, which is the governor pressure minus the sump pressure found in chamber 24. Since the sump pressure is substantially zero, the position of piston 54 is proportional to actual vehicle road speed. With the orifice 46 closed the pressures in chambers 44 and 60 of the servomotor assembly are equal and the spring 64 forces the piston 62 to the left, slacking the flexible chain 68. The vehicle is under the manual control of the operator through the normal throttle linkage.

When the vehicle operator desires to engage the system in the automatic speed maintaining condition of operation, the brake switch 16 is closed and the set switch 18 is open. He therefore closes the set switch, energizing the solenoid 20, which closes valve 38. This hydraulically locks piston 54 at a position corresponding to the actual vehicle road speed at the time that the valve 38 was closed. The vehicle operator can now remove his foot from the accelerator pedal and the system will operate to maintain the vehicle speed to which the position of piston 54 corresponds. With an increase in road load, a decrease in the vehicle speed will be initiated. This will be immediately reflected in the governor pressure, which will decrease. Since this pressure is imposed upon piston 52, this results in a decrease in force urging piston 52 to the left. Therefore, the force from the governor spring 56 will overcome the force generated by the governor pressure in chamber 28 acting on piston 52, moving piston 52 to the right, further opening valve 68 relative to the orifice valve seat 46. The fluid pressure from chamber 44 will decrease through conduit 42 and orifice 46. Since orifice 70 is sufficiently small to be a restrictive orifice, an increased pressure differential will exist across piston 62, with the higher pressure being in chamber 60, causing the piston to move to the right against the spring 64. The tension force in flexible chain 68 will increase and tend to move the throttle linkage to a more open throttle valve position. As the throttle valve opens slightly, the vehicle speed will increase, causing adjustments in the position of piston 62 by movement of valve 48 until a steady state cruising speed is attained which corresponds to the speed indicated by the position of piston 54. Any change in road load causing the vehicle speed to change will cause the flapper valve 48 to move in the opening or closing direction, thereby causing piston 62 to move to open or close the engine throttle as appropriate, thereby maintaining the set vehicle speed. If the operator applies the vehicle brakes, brake switch 16 will be opened, deenergizing solenoid winding 20 and opening solenoid valve 38, with the result that flapper valve 48 closes orifice seat 46 and the flexible chain 68 relaxes with leftward movement of piston 62, returning the vehicle to the manual control of the operator.

The structure schematically shown in FIGURE 2 is similar to that of FIGURE 1 in configuration and operation. However, it utilizes a locking piston to hold the speed setting piston in position at the selected speed. Also, the circuitry incorporates additional fail-safe features. The system includes a housing 110 containing both the valve assembly 112 and the servomotor assembly 114. The transmission governor assembly 116 is schematically illustrated as including centrifugal weights 118 which act on a governor valve 120 so that transmission line pressure received by the governor assembly through conduit 122 is modified to establish governor pressure in chamber 124 and conduit 126. The governor pressure corresponds to actual vehicle road speed.

The servomotor assembly 114 includes a cylinder bore 128 having piston 130 reciprocably received therein and dividing the bore into chambers 132 and 134. A restrictive orifice 136 extends through piston 130 and fluid connects chambers 132 and 134. Piston rod 138 extends from the piston outwardly through chamber 132 and through a wall of the housing. The piston rod is connected by the flexible chain 140 to the throttle valve link 142. Link 142 is a part of the throttle valve linkage for controlling the engine throttle valve 144. The throttle valve is also manually controlled by the vehicle operator through actuation of link 142 by movement of rod 146. A spring 148 urges the piston rod 132 and the piston 130 to the left as seen in the drawing, thereby tending to relax the flexible chain 140 and permitting the throttle valve 144 to move under influence of the usual throttle closing spring.

A valve bore 150 is also formed in housing 110 with the left half having a slightly smaller diameter than the right half. Piston 152 is reciprocably received in the smaller diameter section of bore 150 and valve piston 154 is reciprocably received in the larger diameter section of the bore 150. A compression spring 156 is positioned between the two pistons urging them apart. The outer ends of the bore 150 constitute chamber 158 adjacent piston 152 and chamber 160 adjacent valve piston 154. The center portion of the bore constitutes chamber 162 which is between the two pistons. A passage 164 interconnects chamber 132 and chamber 158. A similar passage 166 interconnects chamber 134 and a portion of bore 150 adjacent chamber 160. The valve piston 154 is a spool valve having lands 168 and 170 on either end so that the groove between the lands defines a chamber 172. Passage 166 and the left edge of land 170 cooperate to provide a valve controlling the passage of fluid from chamber 134 to chamber 172. A pin 174 is mounted in the housing 110 and extends into chamber 172 so that it may be engaged by land 170 and provide a stop for valve piston 154 in its leftward movement. When the valve land 170 is against the pin 174, passage 166 is closed by land 170. A T passage 176 is formed in valve piston 154 and connects chamber 172 with chamber 162. A passage 178 connects chamber 162 with an exhaust conduit 180 leading to the transmission oil sump 182. A solenoid actuated valve 184 in exhaust conduit 180 is normally closed and is opened by energization of the solenoid 186.

Housing 110 is also provided with a passage 188 connecting chamber 158 with a chamber 190 provided in one end of a bore 192. A locking piston 194 is reciprocably received in bore 192 and has a pin extension 196 which is movable by movement of the piston into and out of locking engagement with piston 152. Bore 192 is arranged axially perpendicular to bore 150 and so positioned that the pin 196 may engage the piston 152 while the piston is in any of the positions it may normally attain. A spring 198 acts against piston 194 urging the pin 196 out of locking engagement with the piston 152. The spring is positioned in chamber 200 defined by the end of bore 192 opposite chamber 190. A restrictive orifice 202 interconnects chamber 200 and passage 178. A passage 204 interconnects chamber 190 and chamber 160.

The electrical control circuit of the system includes a source of electrical energy such as battery 206, solenoid 186, control switch 208, normally closed brake switch 210, and ignition switch 212. An indicator lamp 214 may be provided to indicate energization of solenoid 186. A holding relay 216 is also provided to close the holding switch 218 when the control switch 208 is moved to the "on" position so that, when the switch is manually released to the center position shown, the solenoid circuit remains energized until the switch is moved to the "off" position.

When the vehicle is running under manual control with the solenoid 186 deenergized, governor pressure from the transmission governor assembly 116 is found in all chambers and passages in the housing 110, including passage 178 and the portion of exhaust conduit 180 between valve 184 and passage 178. Since the pressures are balanced on piston 194, spring 198 holds locking pin 196 away from piston 152. Spring 148 also holds servomotor piston 130 to the left, therefore relaxing the flexible chain 140 and permitting free manual control of the throttle valve 144 through the manual linkage 146. When the vehicle operator desires to energize the system, he moves control switch 208 to the "on" position. Assuming the brake switch 210 and ignition switch 212 to be closed, as they normally are when the operator energizes the system, solenoid 186 is energized and is held energized by holding relay 216. Solenoid 186 opens valve 184, thereby connecting passage 178 and chambers 162 and 172 with exhaust. This also connects chamber 200 with exhaust through orifice 202. Orifice 202 is preferably of such a size that it dumps pressure from chamber 200 at a rate giving the system stability. If it is too small, piston 194 and locking pin 196 will move too slowly toward the lock position, allowing the drop in pressure in passage 178 and chamber 162 to have an adverse effect of the position of piston 152. If it is too large, piston 194 will move too quickly, giving an adverse pressure change effect on chambers 132 and 158. When of a proper size, these effects will be offset and the system will lock in at the speed desired instead of being offset. The governor pressure in chamber 190 then overcomes the force of spring 198, which is no longer reinforced by pressure in chamber 200, and piston 194 moves pin 196 into engagement with piston 152, locking it in place. The position of piston 152 in bore 150 reflects the vehicle speed at which the vehicle is traveling when the solenoid 186 was energized, and this speed becomes the desired or selected speed at which the system is to maintain the vehicle road speed. The valve piston 154 will permit a decrease in pressure in chamber 134 by modulating action of land 170 in cooperation with passage 166 so that piston 130 will move to the right under influence of pressure in chamber 132, thereby tensioning chain 140 so that it holds throttle valve 144 open a sufficient amount to maintain the vehicle speed at the selected speed without further manipulation of the manual throttle rod 146 by the vehicle operator.

If the vehicle speed increases due to a decrease in road load, the pressure in chamber 132 increases. However, this pressure is also transmitted to chamber 160 which urges valve piston 154 leftwardly against the force of spring 156, therefore further restricting or even closing passage 166, causing a buildup in pressure in chamber 162, resulting in movement of piston 130 to the left and permitting the throttle closing spring to move the throttle valve 144 toward the closed throttle position, thereby decreasing vehicle speed to the selected speed. If the vehicle tends to slow down due to an increased road load, the governor pressure decreases and valve piston 154 moves to the right under the force of spring 156, opening passage 166 further to exhaust, thereby decreasing the pressure in chamber 162 so that the governor pressure in chamber 132 moves piston 130 rightwardly against the force of spring 148, further tensioning chain 140 and moving the throttle valve 144 to a more open position. The vehicle speed is therefore increased due to increased power and speed of the vehicle engine, until the selected speed is again attained.

When the operator desires to disengage the system, he either moves the control switch 208 to the "off" position, applies the brakes to open brake switch 210, or opens ignition switch 212. This deenergizes the solenoid 186 and the holding relay 216. Valve 184 closes, so that pressure builds up in chambers 134, 162 and 200. The pressure in chamber 200 releases piston 152 and the pressure in chamber 134 moves the piston 130 to the left, slacking the chain 140 and returning manual control of the throttle valve 144 to the vehicle operator.

What is claimed is:
1. A vehicle road speed control system comprising: a source of fluid pressure reflecting vehicle road speed;
 a fluid pressure actuated servomotor selectively controlling vehicle road speed and having
  a power wall,
  first and second fluid pressure chambers separated by said power wall,
  means urging said power wall toward said first chamber,
  and restrictive fluid flow means interconnecting said first and second chamber;
 valve means fluid connected with said second chamber and exhaust; and valve control means for said means including
  opposed differential area fluid pressure responsive means receiving pressure from said source,
  yieldable means intermediate said valve means and the smaller area fluid pressure responsive means,
  and means selectively locking said smaller area fluid pressure responsive means against movement whereby changes in fluid pressure from said source act on the larger area fluid pressure responsive means and said yieldable means to control said valve means by modulating the opening thereof in accordance with said changes in fluid pressure and thereby control the fluid pressure differential across said servomotor power wall to move said power wall to control vehicle road speed.

2. The system of claim 1, said selective locking means including a normally open valve selectively closed to lock fluid pressure acting on the smaller area one of said fluid pressure responsive means at the fluid pressure reflecting the vehicle road speed existing when said valve is closed and thereby establishing the desired vehicle road speed.

3. The system of claim 1, said selective locking means including a normally released responsive member selectively lockingly engaging the smaller area one of said fluid pressure responsive means,
 and means selectively increasing the pressure differential on said pressure responsive member in the locking direction to lock the smaller area one of said fluid pressure responsive means in a position reflecting desired vehicle road speed.

4. The system of claim 1, said valve means comprising an orifice type valve seat and a flapper valve controlling said orifice type valve seat, said flapper valve being engaged and moved relative to said orifice type valve seat by said yieldable means and by the larger one of said fluid pressure responsive means.

5. The system of claim 1, said valve means and the larger one of said fluid pressure responsive means being a spool valve piston, said valve means further including a passage controlled by relative movement thereto of a portion of said spool valve piston.

6. The system of claim 1, said selective locking means including a valve and a valve operating solenoid and means selectively energizing and deenergizing said solenoid.

7. The system of claim 6, said valve being a normally open solenoid closed valve intermediate said source of pressure and the smaller area one of said fluid pressure responsive means.

8. The system of claim 6, said valve being a normally closed solenoid opened valve,
 and a pressure differential actuated member actuatable by the opening of said valve to mechanically lock the smaller area one of said fluid pressure responsive means against movement.

9. The system of claim 1, said first chamber and the smaller area one of said fluid pressure responsive means and the larger area one of said fluid pressure responsive means being in fluid series,
 said first chamber and said second chamber and an exhaust chamber being in fluid series,
 said valve means controlling the fluid passing from said second chamber to said exhaust chamber,
 said selective locking means including
  a valve normally closed to disconnect said exhaust chamber from exhaust
  and a locking piston responsive to the pressure differential and pressure in said exhaust chamber to lock the smaller area one of said fluid pressure responsive means against movement upon a sufficient pressure differential generated by opening said normally closed valve and connecting said exhaust chamber to exhaust.

10. The system of claim 1, said fluid pressure responsive means being fluid Y-connected with said first chamber, and said selective locking means including a normally open valve closable to trap pressure acting only on the smaller area one of said fluid pressure responsive means.

References Cited
UNITED STATES PATENTS

| | | | |
|---|---|---|---|
| 2,972,391 | 2/1961 | Faiver et al. | 180—108 |
| 2,976,946 | 3/1961 | Denman et al. | 180—108 |
| 3,062,310 | 11/1962 | McCathron et al. | 180—109 |
| 3,065,813 | 11/1962 | Bookout et al. | 180—108 |
| 3,081,837 | 3/1963 | Fiteny | 180—108 |
| 3,133,611 | 5/1964 | Halsey et al. | 180—108 |

KENNETH H. BETTS, *Primary Examiner.*

UNITED STATES PATENT OFFICE
CERTIFICATE OF CORRECTION

Patent No. 3,353,620  November 21, 1967

Kenneth G. Leslie et al.

It is hereby certified that error appears in the above numbered patent requiring correction and that the said Letters Patent should read as corrected below.

Column 6, line 6, after "said" insert -- valve --; line 30, after "released" insert -- pressure --.

Signed and sealed this 7th day of January 1969.

(SEAL)
Attest:

Edward M. Fletcher, Jr.
Attesting Officer

EDWARD J. BRENNER
Commissioner of Patents